United States Patent [19]

Freund

[11] Patent Number: 4,583,484
[45] Date of Patent: Apr. 22, 1986

[54] PRESSURE-CHANGE INDICATOR

[76] Inventor: Erwin Freund, 54 Dawson Ave., Clifton, N.J. 07011

[21] Appl. No.: 517,577

[22] Filed: Jul. 27, 1983

[51] Int. Cl.$^4$ .............................................. G01L 23/00
[52] U.S. Cl. .................................... 116/268; 73/432 R
[58] Field of Search .................... 116/266, 268, 272; 73/432 CR, 432 D, 432 R, 300, 302, 709, 713; 405/185, 186

[56] References Cited

U.S. PATENT DOCUMENTS

| | | | |
|---|---|---|---|
| 2,775,123 | 12/1956 | Salle et al. | 73/179 |
| 3,121,333 | 2/1964 | Alinari | 73/432 D |
| 3,933,049 | 1/1976 | Shamlian et al. | 73/432 D |
| 3,992,949 | 11/1976 | Edmondson | 73/432 D |

FOREIGN PATENT DOCUMENTS 1334496 10/1973 United Kingdom ............. 73/432 D

Primary Examiner—Charles Frankfort
Assistant Examiner—Patrick R. Scanlon

[57] ABSTRACT

The present disclosure relates to a pressure change indicator useful in determining whether the pressure-change/time values are exceeding safe levels. The device is constructed of clear plastic and employs a ball indicator in a cylindrical chamber operatively connected to an air reservoir. The reservoir is filled at the maximum dive depth with ambient air until air leaks from air outlets in the wall of the reservoir. As the air expands during the ascent it exits through the outlets. At excessive ascent rates, air cannot escape through the outlet fast enough and forces the ball indicator down the chamber past an indicator line alerting the diver.

3 Claims, 1 Drawing Figure

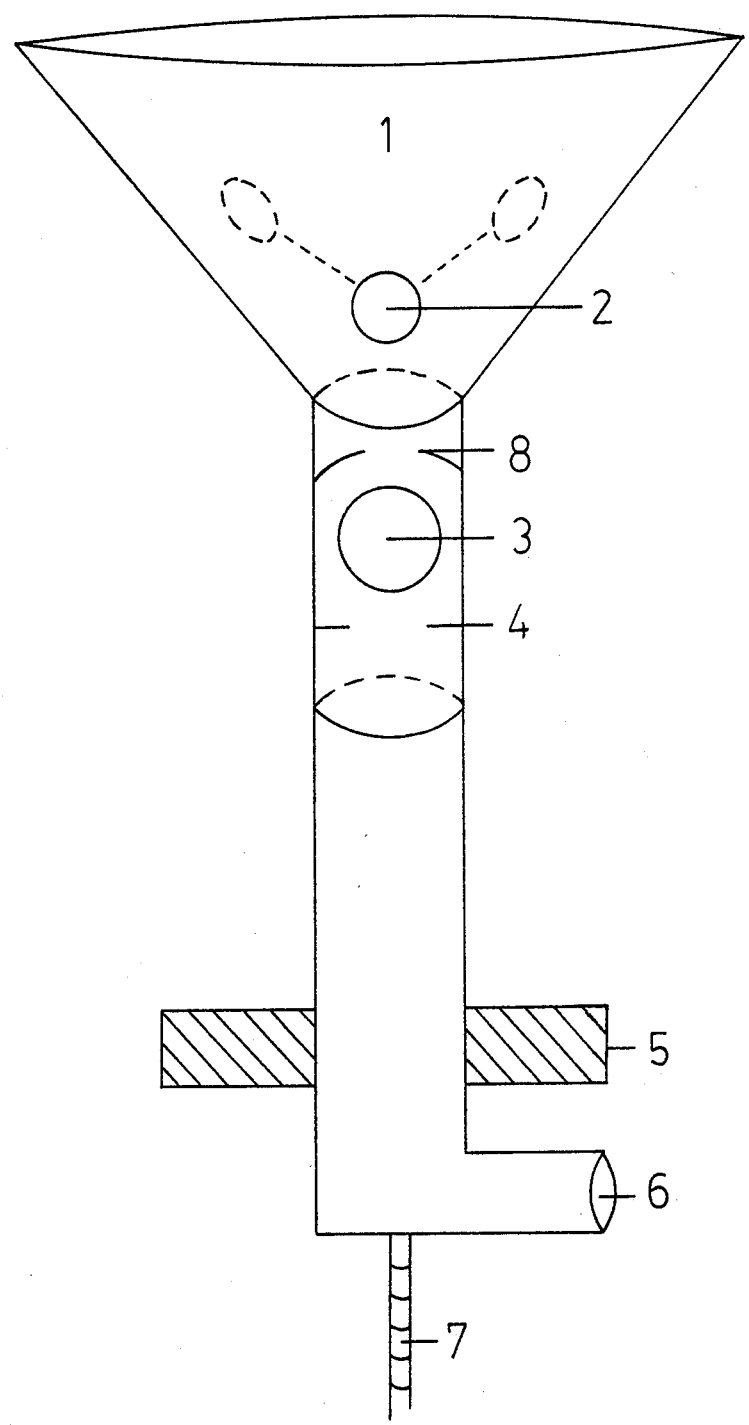

PRESSURE-CHANGE INDICATOR

BACKGROUND OF THE INVENTION

Arterial gas embolism is the leading causing of non-accidental injury or death to a diver. This is the result of a too fast ascent, i.e. an ascent that exceeds the safe limit of 60 feet per minute. Because this rate happens to be approximately equal to the ascent-rate of the smallest exhaust air bubbles, the diver uses them as a rough indicator. Air bubbles however, expand while ascending (which increases their ascent rate) and then burst into smaller ones, which makes this technique less reliable.

To achieve a more accurate and safe ascent, a simple apparatus is required which does not measure ascent-rate in vertical feet/second. but is sensitive to pressure change/time. This latter unit is more relevent to the law of physics that applies to the diver with respect to the pressure/volume relationship as stated by Boyle's law. For example, the air volume increase during a rise from 90 to 60 feet depth is 8%, whereas from 30 feet to the surface (0 feet) the increase is 100%. Thus, it is more important to measure pressure-change/time than ascent-rate/time, because even when the latter is constant, the pressure-change/time is not.

SUMMARY

The present invention relates to a device for determining in a simple and inexpensive manner whether the pressure-change/time values during ascent from a deep sea dive for exceeding safe levels. The device comprises a cylindrical chamber containing a free moving ball indicator which can change position in response to air pressure changes. The chamber is marked with an external indicator line. As the diver ascends, air contained in a reservoir connected to the chamber expands and exits through an air outlet. If the rate of ascent exceeds predetermined values, the rate of flow through the exit is less than the rate of expansion thus forcing air into the chamber and depressing the indicator ball below the fixed line. The chamber is transparent and the diver can observe the ball location and can adjust his rate of ascent until the ball returns to its proper position.

DESCRIPTION OF THE DRAWING

The Drawing provides a front schematic view of the pressure change indicator of the present invention.

DESCRIPTION OF THE PREFERRED EMBODIMENT

The apparatus of the present invention and the manner in which it functions to measure pressure-change/time during a diving ascent can be more readily understood by reference to the specific embodiment shown in the Drawing. The whole apparatus is preferably constructed of a transparent, rigid plastic material capable of withstanding the pressures existant in diving depths of sea water.

The subject apparatus comprises a central cylindrical chamber having a first and a second end. The first end is operatively connected to an air inlet means 6 which is preferably in the form of a mouthpiece having a diameter less than said chamber. The chamber contains free moving ball indicator 3 and the outer circumference of the chamber is marked with an indicator line 4. The second end of said chamber has a size restricted opening 8 which prevents passage of the ball out of the chamber. This second end is operatively connected to an air reservoir 1. This air reservoir has air outlet holes 2 located around its outer surface, most preferably in spaced symmetric fashion at the same height and 120 degress apart. The diameter of the air outlet holes are selected so as to allow all expanded air to escape from reservoir 1 upon a decrease in pressure equal or less than one atmosphere/minute. Use of the three holes prevents tilting of the apparatus during air discharge.

The apparatus of the invention may have optional features to aid in convenience during use. Thus, a strap 7 may be provided to attach to the divers arm. Additionally, a ring shaped lead weight 5 may be attached around the lower circumference of the said chamber. This lead weight should equal the weight of the water volume displaced by the apparatus. This will eliminate balance problems of the diver.

The apparatus operates in the following manner. Once the diver reaches the deepest point of his dive, he blows air under ambient pressure into the apparatus through inlet mouthpiece 6 until air is observed escaping from outlet holes 2. The apparatus will remain in an upright position due to the positive buoyancy of the air volume trapped in reservoir 1. Upon ascending (regulations require that a diver must first go to the maximum intended depth), the air in reservoir 1 will expand and escape through outlet holes 2. If the safe ascent rate equivalent to a pressure rate change of one atmosphere per minute is exceeded, the excess air cannot exit through the outlets and will be pushed downward into the chamber through inlet 8. This airflow will push the indicator ball 3 downward thus displacing it below the safe indicator line 4. This will alert the diver to the unsafe ascent procedure.

In theory, to which the present invention is not limited, air volume in reservoir 1 can be thought of as the total volume of the respiratory system of the diver and the outlet holes 2 combined as the oral opening. The position of the ball indicator 3 is analogous to the pulmonary alveoli, which are stretched beyond their limits as the ball "dives" below line 4. Because the lungs are allowed to stretch somewhat, the air volume in 1 in the apparatus can also be trapped by a silicone membrane (not shown) (instead of a plastic cap) having an elasticity equal to the lungs. This embodiment allows a better judgment of the physiological constraints that are exerted on the diver by the underwater environment.

I claim:

1. A pressure change indicator useful in assisting divers during ascents said indicator being constructed of a transparent material and comprising in combination a hollow, cylindrical chamber means having a first end and a second end, air inlet means operatively connected to the said first end of said chamber means, air reservoir means operatively connected to said second end of said chamber means, said reservoir means having an air outlet means, said reservoir means receiving air blown by the diver into said air inlet means until substantially all water is forced out of the reservoir means through the outlet means and said reservoir means is substantially filled with air, said cylindrical chamber means being further characterized in containing a free moving ball indicator means so constructed as to be too large to pass out of said chamber means at either of said ends but still allowing air to pass through said chamber means into said reservoir means, and said chamber means having an indicator line around its circumference at a point proximate to said second end whereby if too rapid an ascent rate is achieved air expanding in said air reservoir means cannnot pass out of said outlet means quickly enough and will thereby push said ball indicator means below said indicator line against the force of the water filling said cylindrical chamber means.

2. The pressure change indicator of claim 1 wherein said air outlet means comprises three air holes spaced symmetrically 120 degrees from each other around said air reservoir means.

3. The pressure change indicator of claim 1 wherein a lead collar means is provided circumferentially around the exterior of said cylindrical chamber means at a point proximate to said first end.

* * * * *